(12) United States Patent
Zavitz (10) Patent No.: US 10,435,913 B2
(45) Date of Patent: Oct. 8, 2019

(54) METHOD AND APPARATUS FOR CONSTRUCTING A CONCRETE STRUCTURE IN STAGES

(71) Applicant: Tindall Corporation, Spartanburg, SC (US)

(72) Inventor: Bryant Zavitz, Dunwoody, GA (US)

(73) Assignee: Tindall Corporation, Spartanburg, SC (US)

( * ) Notice: Subject to any disclaimer, the term of this patent is extended or adjusted under 35 U.S.C. 154(b) by 2 days.

(21) Appl. No.: 15/821,331

(22) Filed: Nov. 22, 2017

(65) Prior Publication Data

US 2018/0142491 A1 May 24, 2018

Related U.S. Application Data

(60) Provisional application No. 62/425,957, filed on Nov. 23, 2016.

(51) Int. Cl.
*E04H 12/34* (2006.01)
*E04H 12/18* (2006.01)
(Continued)

(52) U.S. Cl.
CPC ............ *E04H 12/34* (2013.01); *E04H 12/16* (2013.01); *E04H 12/18* (2013.01); *E04H 12/341* (2013.01);
(Continued)

(58) Field of Classification Search
CPC ..... F05B 2230/60; E04H 12/16; E04H 12/18; E04H 12/34; F03D 13/40; F03D 13/20
(Continued)

(56) References Cited

U.S. PATENT DOCUMENTS 3,407,007 A * 10/1968 Fassauer ................ A01F 25/16
222/405
3,998,292 A * 12/1976 Holterbosch ............ E04G 1/36
182/128
(Continued)

FOREIGN PATENT DOCUMENTS

DE 3242570 A1 6/1983
DE 102015012635 A1 3/2017
JP 2005307691 A 11/2005

OTHER PUBLICATIONS

International Search Report and Written Opinion issued in related International Application No. PCT/US2017/063080 dated Mar. 6, 2018.

*Primary Examiner* — Brian E Glessner
*Assistant Examiner* — Adam G Barlow
(74) *Attorney, Agent, or Firm* — Meunier Carlin & Curfman LLC (57) ABSTRACT

Various implementations comprise a method and apparatus for constructing a concrete structure in stages. In various implementations, an apparatus includes a base, a support column located on the base, and a movable scaffolding rotatably coupled to a top of the support column. According to various other implementations, a method for assembling a tower stage includes: (1) providing a base platform; (2) coupling a pole to the base platform; (3) disposing two or more staves around the pole; (4) coupling the staves together to form the tower stage; and (5) removing the tower stage from the platform.

7 Claims, 9 Drawing Sheets (51) Int. Cl.
*E04H 12/16* (2006.01)
*F03D 13/40* (2016.01)
*F03D 13/20* (2016.01)
*F03D 13/10* (2016.01)

(52) U.S. Cl.
CPC .............. *F03D 13/10* (2016.05); *F03D 13/20* (2016.05); *F03D 13/40* (2016.05); *F05B 2230/60* (2013.01)

(58) Field of Classification Search
USPC .............. 52/40, 651.01, 745.17, 745.18, 836
See application file for complete search history.

(56) References Cited

U.S. PATENT DOCUMENTS

| | | | | |
|---|---|---|---|---|
| 4,454,693 | A * | 6/1984 | Price | B65G 65/36 52/196 |
| 4,620,608 | A * | 11/1986 | Gilbreath | E04G 1/24 182/127 |
| 6,782,667 | B2 * | 8/2004 | Henderson | E04H 12/182 52/116 |
| 7,165,578 | B2 * | 1/2007 | Kamiyama | E03F 3/06 138/98 |
| 8,136,329 | B2 * | 3/2012 | Willis | E04H 12/08 52/848 |
| 2006/0213145 | A1 * | 9/2006 | Haller | E04H 12/34 52/651.01 |
| 2008/0184633 | A1 * | 8/2008 | Hamilton | E04H 12/2284 52/127.12 |
| 2009/0031639 | A1 * | 2/2009 | Cortina | E04H 12/12 52/40 |
| 2009/0308019 | A1 * | 12/2009 | Knox | E04H 12/12 52/742.14 |
| 2010/0162652 | A1 * | 7/2010 | Croes | E04H 12/085 52/651.01 |
| 2011/0148072 | A1 * | 6/2011 | Poulsen | B60P 3/40 280/404 |
| 2014/0173898 | A1 * | 6/2014 | Poulsen | B60P 1/04 29/889.2 |
| 2014/0215930 | A1 * | 8/2014 | Zavitz | E04H 12/16 52/40 |
| 2014/0248112 | A1 * | 9/2014 | Ruijter | B60P 7/06 414/800 |
| 2016/0194896 | A1 * | 7/2016 | Pondorfer | E04H 12/344 52/745.18 |
| 2016/0201350 | A1 * | 7/2016 | Zavitz | E02D 27/425 52/223.5 |

* cited by examiner

SECTION A-A

FIG. 9

METHOD AND APPARATUS FOR CONSTRUCTING A CONCRETE STRUCTURE IN STAGES

CROSS REFERENCE TO RELATED APPLICATIONS

The application claims priority to U.S. Patent Application No. 62/425,957, entitled "Method and Apparatus for Constructing a Concrete Structure in Stages," filed Nov. 23, 2016, the content of which is herein incorporated by reference in its entirety.

FIELD OF THE INVENTION

Various implementations of the present invention relate to a method and apparatus for constructing a concrete structure. In particular, various implementations relate to constructing a concrete structure in stages using pre-cast concrete components.

BACKGROUND

Conventional methods and apparatuses for constructing a structure with field poured components can be labor and time intensive. The use of pre-cast elements is desired, but can lead to a time-consuming assembly process on site. Accordingly, a more efficient method and apparatus for constructing a tower in stages is needed.

BRIEF SUMMARY

Various implementations of the invention comprise a method and apparatus for constructing a concrete structure. In one implementation, a structure includes a base, a support column located on the base, and a movable scaffolding rotatably coupled to a top of the support column.

According to various implementations, an apparatus includes a base platform, a support column coupled to and extending vertically from an upper surface of the base platform, and a movable scaffolding. The movable scaffolding has an upper portion that is rotatably coupled to a distal end of the support column.

In some implementations, the apparatus further includes a rail disposed on the base platform circumferentially around and spaced apart from the support column. A lower portion of the movable scaffolding engages the rail for moving around the support column on the rail.

In some implementations, the apparatus further includes a support fixture disposed on the base platform circumferentially around and spaced apart from the support column. The support fixture is disposed radially between the rail and the support column. The support fixture is adapted for receiving a bottom edge of one or more staves.

In some implementations, the apparatus further includes a bolting platform affixed to the support column. The bolting platform extends radially outwardly from the support column.

In some implementations, the base platform further includes one or more supports for engaging the ground and supporting the apparatus above the ground. For example, in some implementations, the supports comprise threaded bolts that are axially movable between a first, extended position in which the supports contact the ground and a second, raised position in which the supports do not contact the ground. In some implementations, the base platform comprises eight supports.

In some implementations, the movable scaffolding further comprises at least one scaffolding platform. The scaffolding platform is spaced vertically above the base platform.

According to various other implementations, a method for assembling a tower stage includes: (1) providing a base platform; (2) coupling a pole to the base platform; (3) disposing two or more staves around the pole; (4) coupling the staves together to form the tower stage; and (5) removing the tower stage from the platform.

In some implementations, the method further includes coupling a bolting platform to the pole and resting the staves against the bolting platform. For example, in some implementations, the base platform comprises a support fixture disposed circumferentially around and spaced apart from the pole, and disposing the two or more staves around the pole comprises disposing a first end of each stave in the support fixture. In a further implementation, the base platform further comprises a rail that is disposed circumferentially around and is spaced radially outwardly of the support fixture, and the method further comprises providing a movable scaffolding that engages the rail at a first end of the scaffolding and is rotatably coupled to a distal end of the pole at a second end of the movable scaffolding.

In some implementations, coupling the staves comprises applying sealant to joints between adjacent staves.

In some implementations, coupling the staves comprises threading at least one horizontal post-tensioning strand through a duct defined through the staves.

In some implementations, the method further includes transporting the base platform with a low boy trailer before assembly.

BRIEF DESCRIPTION OF THE DRAWINGS

A full and enabling disclosure of the present subject matter is set forth in the specification, which makes reference to the appended figures, in which.

DETAILED DESCRIPTION

Reference is presently made in detail to example implementations of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one implementation can be used with another implementation to yield a still further implementation. Thus, it is intended that the present subject matter covers such modifications and variations as come within the scope of the disclosure and equivalents thereof.

FIGS. 1-6 show an apparatus 10 according to one implementation. Apparatus 10 is used to construct concrete structures. Apparatus 10 includes a platform 100, a central structure 200 (including central pole 210 and bolting platform 240), and an outer access scaffold 300. A support fixture is circumferentially disposed on the upper surface of the platform 100 around and spaced apart from the central pole 210. The support fixture receives and supports bottom edges of concrete staves 400 that are part of a stage 500 of the structure. According to some implementations, the support fixture ensures proper alignment of the bottom edges of the staves 400 relative to each other and the central pole 210. For example, in the implementation shown in FIG. 2, the support fixture 105 includes an array of clips that are coupled to the platform 100 in a circumferentially spaced arrangement. For example, the support fixture 105 is a metal clip for receiving the bottom edge of a respective stave 400. And, in other implementations, the support fixture includes a track that is disposed circumferentially around and spaced apart from the central pole 210. The track receives the bottom edges of the stave 400 and guides the alignment of the staves 400.

Figure 1:
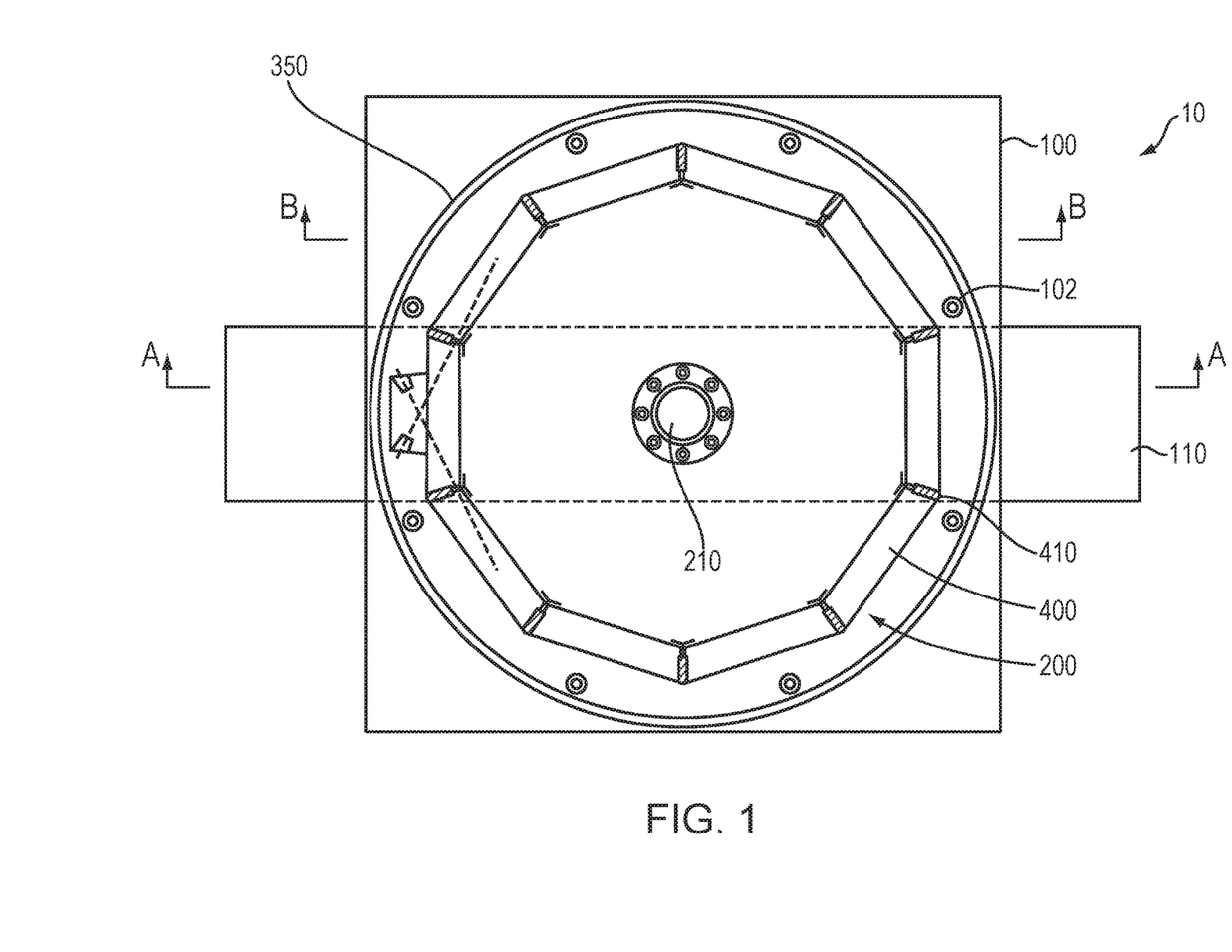
FIG. 1 illustrates a top view of an apparatus for constructing a concrete structure in stages according to an example implementation.
Figure 2:
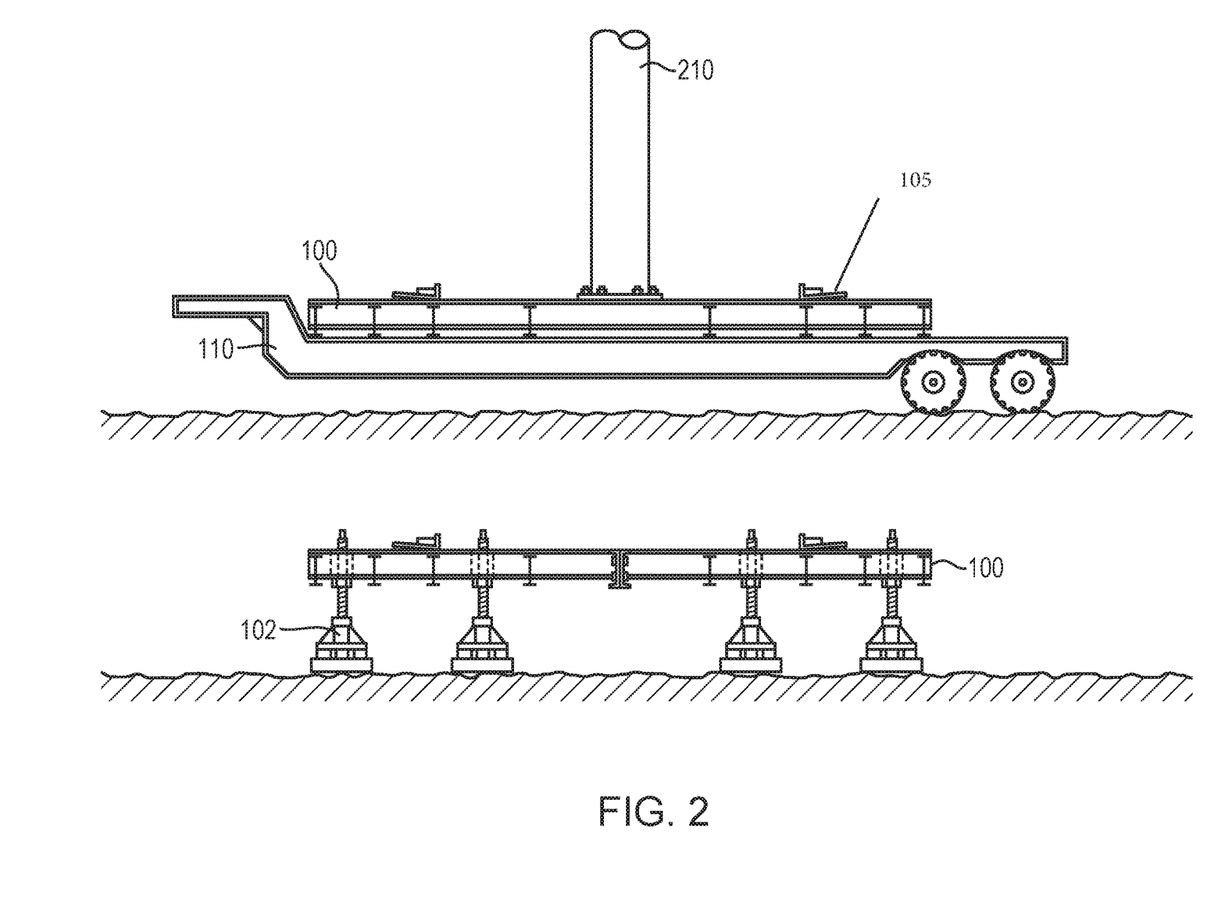
FIG. 2 illustrates a side view of the implementation shown in FIG. 1.

Platform 100 may be supported by supports 102. In one implementation, eight supports 102 are included. As shown in FIG. 2, supports 102 are raised when apparatus 10 is in transit and are lowered to the ground to support the platform 100 when a stage 500 is being built thereon. Low boy trailer 110 is located beneath the platform 100 to transport the platform to the assembly site.

In addition, a rail 350 is disposed on the upper surface of platform 100 radially outwardly from the support fixture 105. The rail 350 is disposed circumferentially around the central pole 210. A bottom portion of access scaffold 300 engages the rail 350 and is movable along the rail 350 (e.g., rolls on wheels that engage the rail 350). Center support pole 210 is also mounted to the top surface of platform 100, and an upper portion of the access scaffold 300 is movably coupled to the center support pole 210. The distance between the rail 350 and the center support pole 210 is selected based on the largest distance expected between staves that are opposite and spaced apart from each other in the stage 500, according to some implementations.

Figure 4:
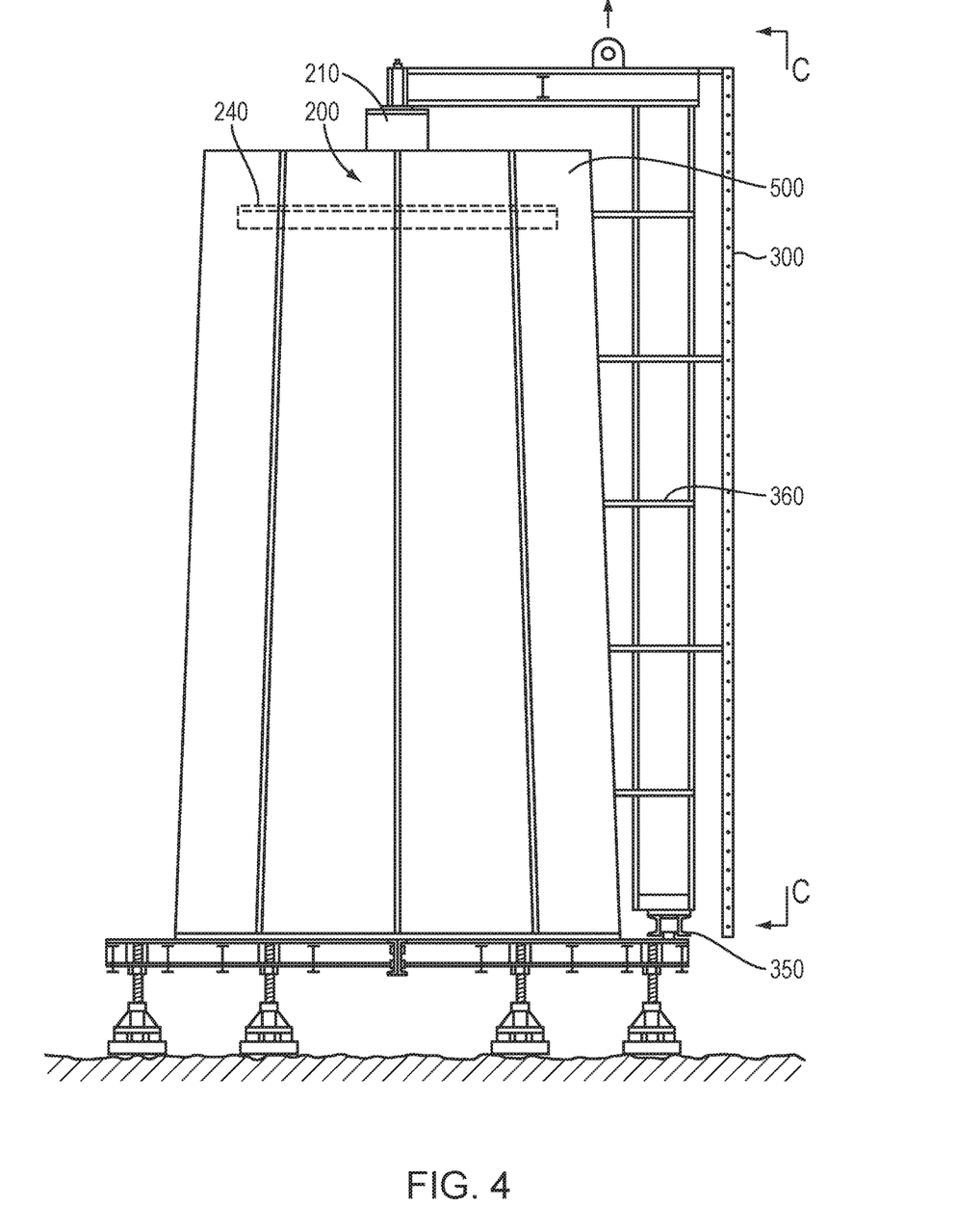
FIG. 4 illustrates an outer side view of the apparatus shown in FIG. 1.
Figure 5:
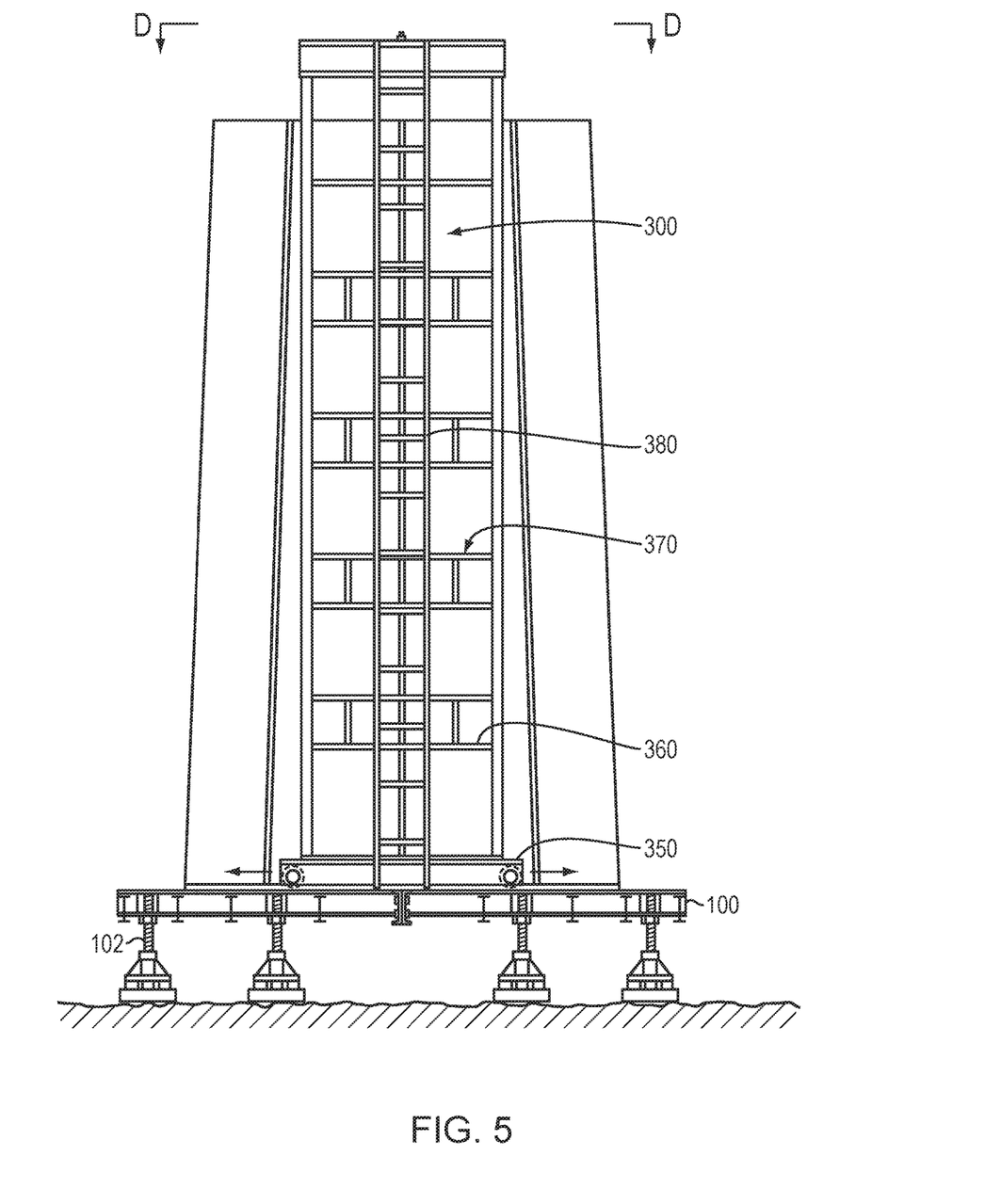
FIG. 5 illustrates a side view of the scaffold 300 shown in FIG. 4.
Figure 7:
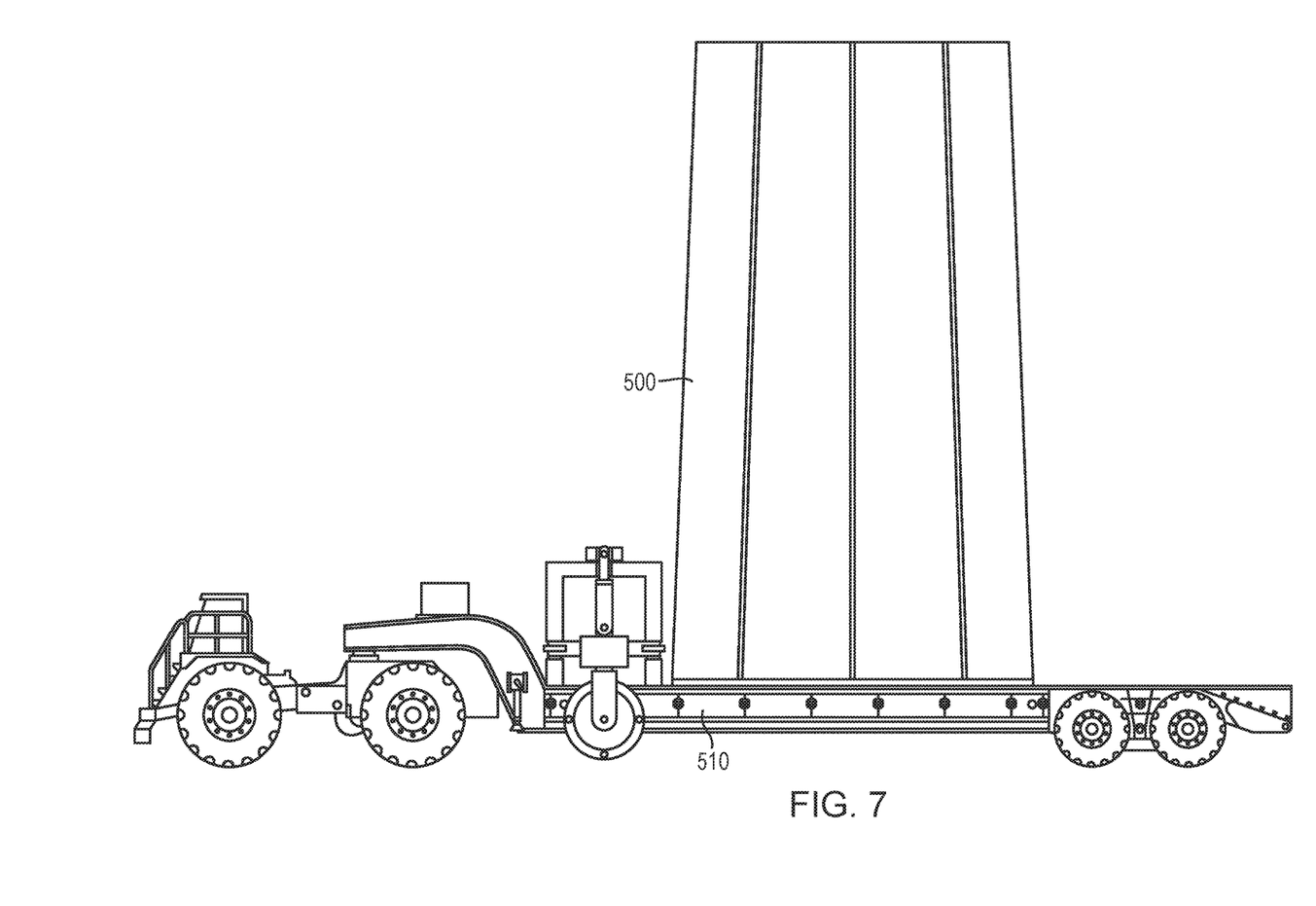
FIGS. 7-9 show views of the finished stage 500 being carried by low boy trailer 510.

In some implementations, the structure to be assembled includes a tower, such as a tower on which a wind turbine can be mounted. However, any concrete structures that can be made in stages are possible. Further, FIGS. 4, 5, and 7 show a stage 500 that tapers inwardly from the bottom to the top. Thus, vertically adjacent stages will have different widths on the top and bottom, and a separate apparatus 10 can be used for constructing each of these different sized stages. (That is, a five-stage tapering tower could be built using five apparatuses 10.) In another implementation, the structure has a constant horizontal cross-section, allowing the same apparatus 10 to make each stage. Even in this case, multiple apparatuses 10 may be used to quicken construction by assembling multiple stages at once. All these modifications are within the scope of the invention as claimed.

To assemble the stage 500, the staves 400 are sequentially lifted onto platform 100 and coupled at joints 410. The figures show an implementation with ten planar shaped staves 400, but in other implementations, any number of staves can be used. In addition, in other implementations, the staves are arc shaped "staves" for forming a cylindrical structure.

Figure 3:
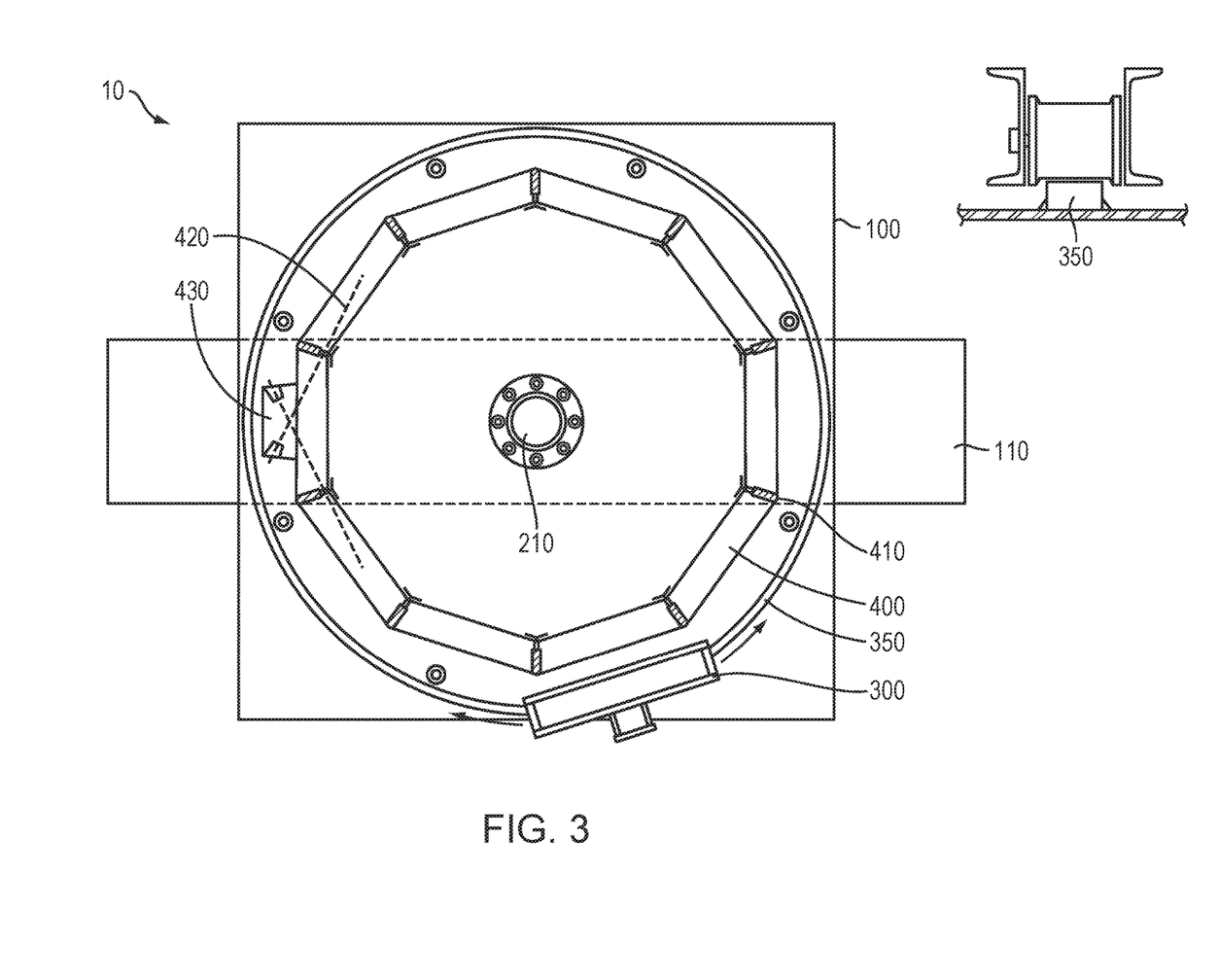
FIG. 3 illustrates a top view of the apparatus shown in FIG. 1 including the scaffold 300.

As shown in FIG. 3, the staves 400 may be held together by one or more horizontal post-tensioning strands 420 that extend through the staves 400 of the stage 500 and are bound at element 430. For example, in some implementations, a duct is defined through each stave 400 (e.g., extending between side edges of each stave 400) and aligns with the duct defined in adjacent staves 400, and the strand 420 extends through the ducts. In FIG. 3, only a portion of the strand 420 is shown in dotted line, but it should be understood that the strand 420 extends through each stave 400 in the stage 500. In further or alternative implementations, the strands 420 encircle the staves 400 around outer surfaces of the staves 400. Other ways of securing the staves together may also be used. Further, multiple post-tensioning strands may be used at various height levels of each stage.

FIG. 3 also shows outer access scaffold 300 running on rail 350 around an outer surface of staves 400. This scaffold 300 allows the workers to access the full height of the joint 410 and apply a sealant/adhesive at each joint 410 between staves 400 and allows the workers to bind any post-tensioning strands 420 outside of the staves 400.

As shown in FIG. 4, access scaffold 300 may have work platforms 360 at various heights to accommodate multiple workers working on different heights at once. For example, FIG. 4 shows six platforms. However, more or less platforms may be used based on a height of the stage being constructed.

In addition, bolting platform 240 is attached to central pole 210. For example, the bolting platform 240 is attached to the central pole 210 at a fixed position along the central pole 210. In some implementations, multiple bolting platforms 240 are attached to the pole 210 at multiple levels (vertically spaced apart along the axis of the pole 210) to accommodate workers sealing the inner surfaces of the staves 400 simultaneously at different heights along the staves 400, or to provide additional support to the staves. Staves 400 rest on bolting platform 240 when they are initially disposed onto the platform 100. When all the staves 400 are joined to create stage 500, bolting platform 240 is no longer needed to support the staves. Thus, the center pole 210 and platform 240 are not attached to the staves 400, such that when the stage 500 is removed from the platform 100, the center pole 210 and platform 240 remain on platform 100. This inner structure can then be used during assembly of the next stage.

Figure 6:
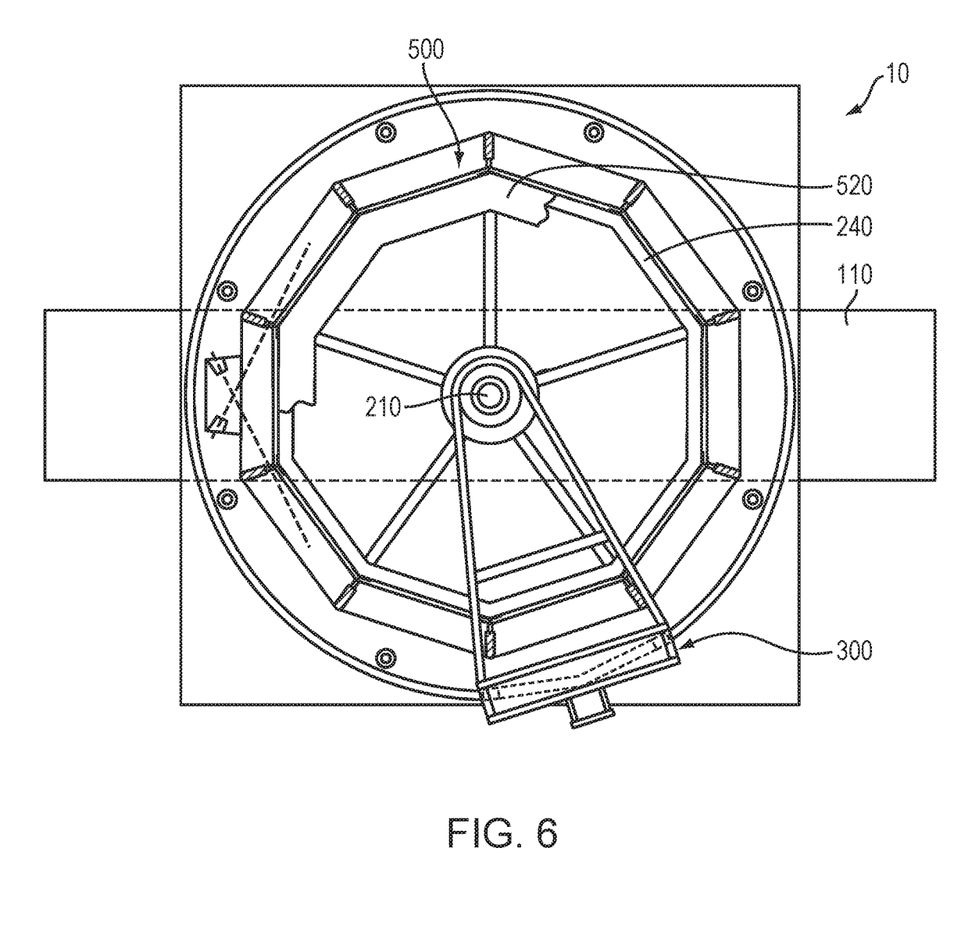
FIG. 6 shows a top view of the structure shown in FIG. 1 including platforms 240 and 520.

FIG. 6 shows a fixed sized bolting platform for assembling a single configuration of a stage. However, a bolting platform with a varying radius could be used, which would allow stages of varying diameters to be assembled on the same platform 100. In this implementation, a first stage 500 would be assembled, the bolting platform 240 would be modified to have a different radius, and then another stage 500 with a different radius could be assembled. For example, according to some implementations, the bolting platform 240 includes at least two arcuate shaped plates that at least partially overlap and are coupled with a bolt engaged in a slot defined by at least one of the elements such that the elements are slidable relative to each other as the bolt is urged through the slot. Sliding the elements relative to each other reduces or increases the radius of the platform 240. These modifications are within the scope of the invention as claimed.

FIG. 5 shows a front view of the scaffold 300 with six platforms 360, guardrails 370 for worker safety, and a ladder 380 running up the center of the platforms 360 for the workers to move between platforms 360.

In the implementation shown in FIG. 6, the bolting platform 240 supports the access platform 520, which is bolted to the distal end portion of stage 500. Thus, access platform 520 remains coupled to the stage 500 and is removed from apparatus 10 with the stage 500. In some implementations, the bolting platform 240 and the access platform 520 are the same element, and prior to removal of the stage 500 from the apparatus 10, the access platform 520 is coupled to the stage 500 and decoupled from the central pole 210.

Figure 8:
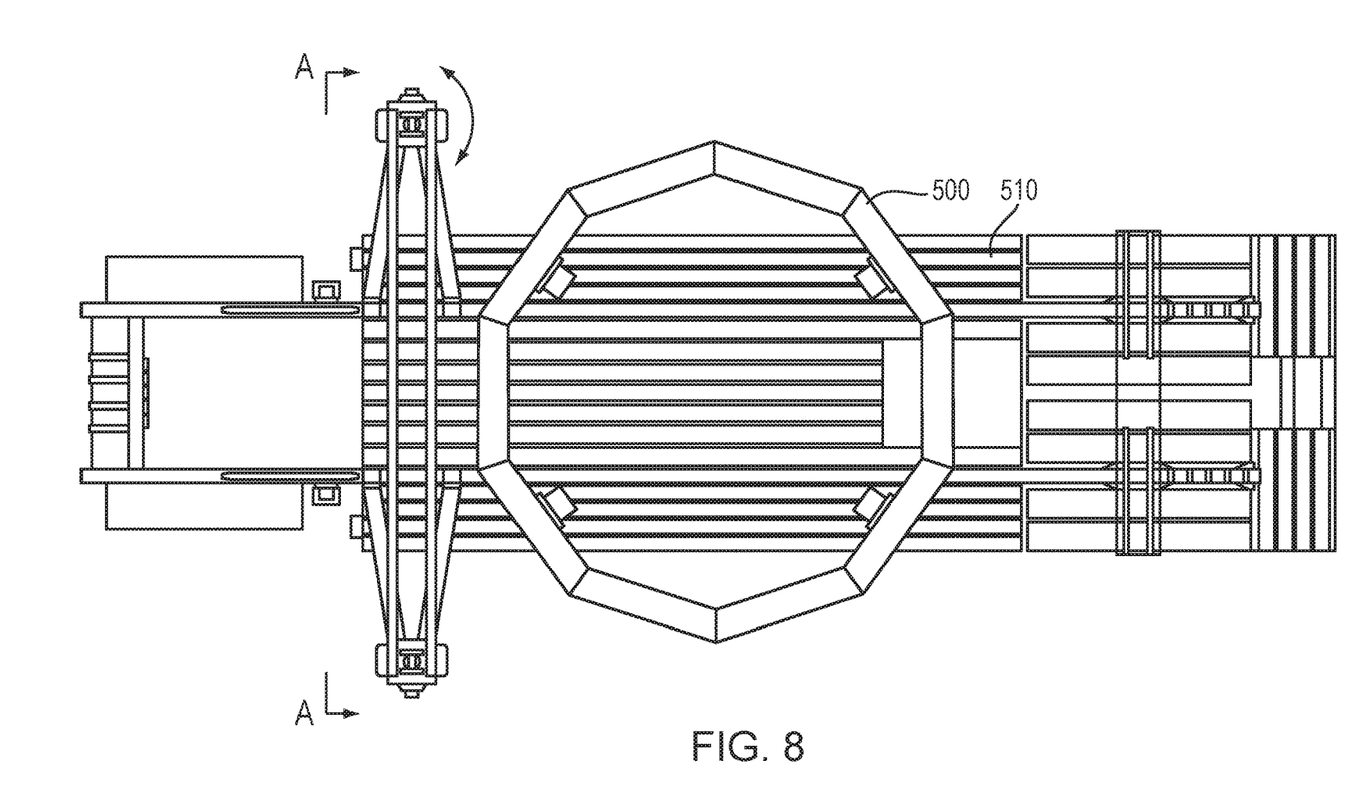
Figure 9:
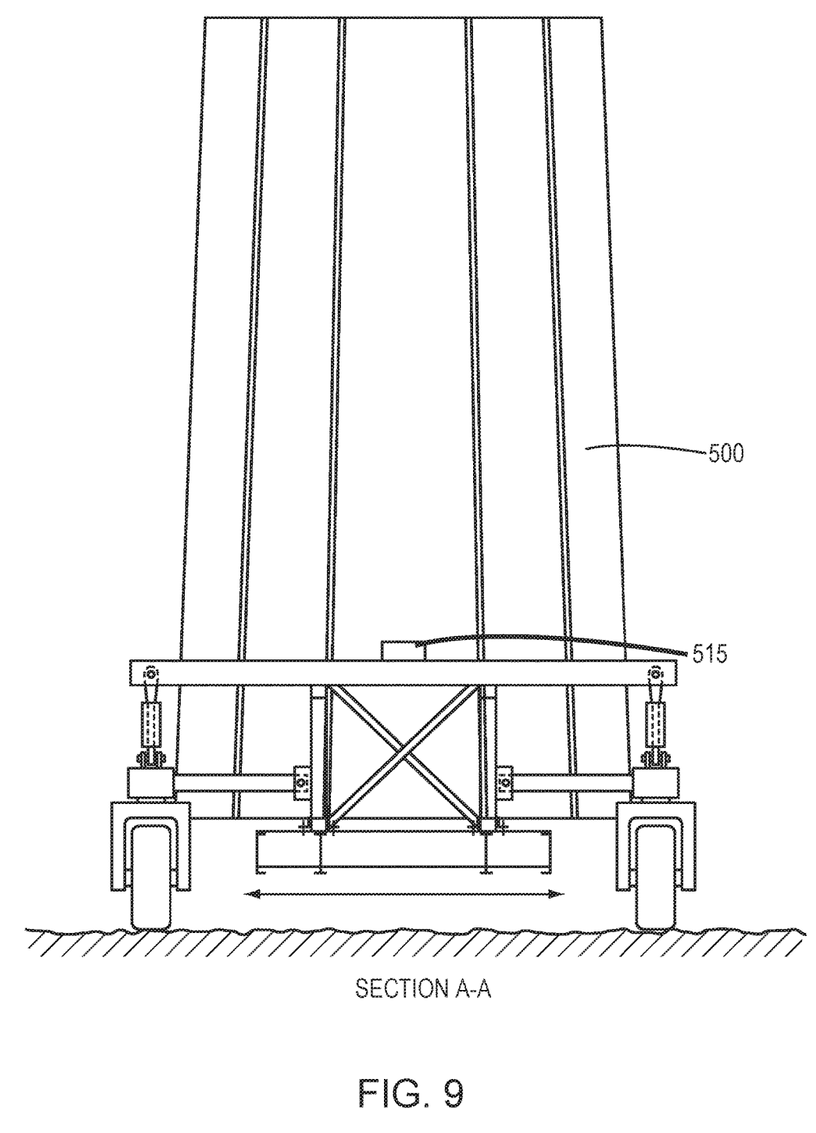

Accordingly, one implementation of a method of using the apparatus 10 is as follows. The platform 100 is brought into position at the assembly site by a first low boy trailer 110. The supports 102 are lowered to contact the ground, and the first low boy trailer 110 is moved out from under the platform 100. The center pole 210 is mounted to the platform 100, and the bolting platform 240 is attached to the center pole 210. Each stave 400 is raised onto the platform 100. A bottom edge of each stave 400 is set down within the support fixture 105, and a portion of an inner surface of each stave 400 is leaned against the bolting platform 240. After all the staves 400 are on the platform 100, the scaffold 300 is rotatably attached to a top of the center pole 210, and a lower portion of the scaffold 300 is engaged on the rail 350. One or more workers can use the scaffold 300 to access the joints 410 between the staves 400 to adhere/seal the joints 410, and post-tensioning cables 420 can be thread through (or around) the staves 400 to couple the staves 400 permanently. Access platform 520 is then attached (e.g., bolted) to stage 500 near a top (distal end relative to the platform 100) of stage 500. The outer scaffold 300 can then be removed from the center pole 210, and the stage 500 can be lifted from the platform 100. The platform 100 can be removed and the stage 500 set on a second low boy trailer 510 to be taken to an assembly site, as shown in FIGS. 7-9. The next stage 500 can then be constructed on the platform 100. In other implementations, the low boy trailer 110 and 510 can be the same trailer.

Low boy trailer 510 includes apparatus 515 which includes a detector which detects any tilt of the truck bed and hydraulic cylinders which compensate for any tilt to prevent the trailer 510 from tipping over.

The present written description uses examples to disclose the present subject matter, and to enable any person skilled in the art to practice the present subject matter, including making and using any devices or systems and performing any incorporated and/or associated methods. While the present subject matter has been described in detail with respect to specific implementations thereof, it will be appreciated that those skilled in the art, upon attaining an understanding of the foregoing, may readily produce alterations to, variations of, and equivalents to such implementations. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

The invention claimed is:

1. A method for assembling a tower stage comprising:
providing a base platform;
coupling a pole to the base platform, wherein the base platform comprises a support fixture disposed circumferentially around and spaced apart from the pole, the base platform further comprising a rail that is disposed circumferentially around and spaced radially outwardly from the support fixture;
providing a movable scaffolding that engages the rail at a first end of the scaffolding and is rotatably coupled to a distal end of the pole at a second end of the movable scaffolding;
disposing two or more staves around the pole, the two or more staves being disposed on the base platform;
coupling the staves together to form the tower stage; and
removing the tower stage from the base platform.

2. The method according to claim 1, further comprising coupling a bolting platform to the pole and resting the staves against the bolting platform.

3. The method according to claim 2, wherein disposing the two or more staves around the pole comprises disposing a first end of each stave in the support fixture.

4. The method according to claim 1, wherein coupling the staves comprises applying sealant to joints between adjacent staves.

5. The method according to claim 1, wherein coupling the staves comprises threading at least one horizontal post-tensioning strand through a duct defined through the staves.

6. The method according to claim 1, further comprising transporting the base platform with a low boy trailer before assembly.

7. The method according to claim 1, further comprising transporting the tower stage with a low boy trailer.

* * * * *